Nov. 18, 1958     B. C. ZICKAFOOSE, JR     2,860,532
PRECISION DRILL AND ALIGNMENT FIXTURE
Filed June 29, 1956     2 Sheets-Sheet 2
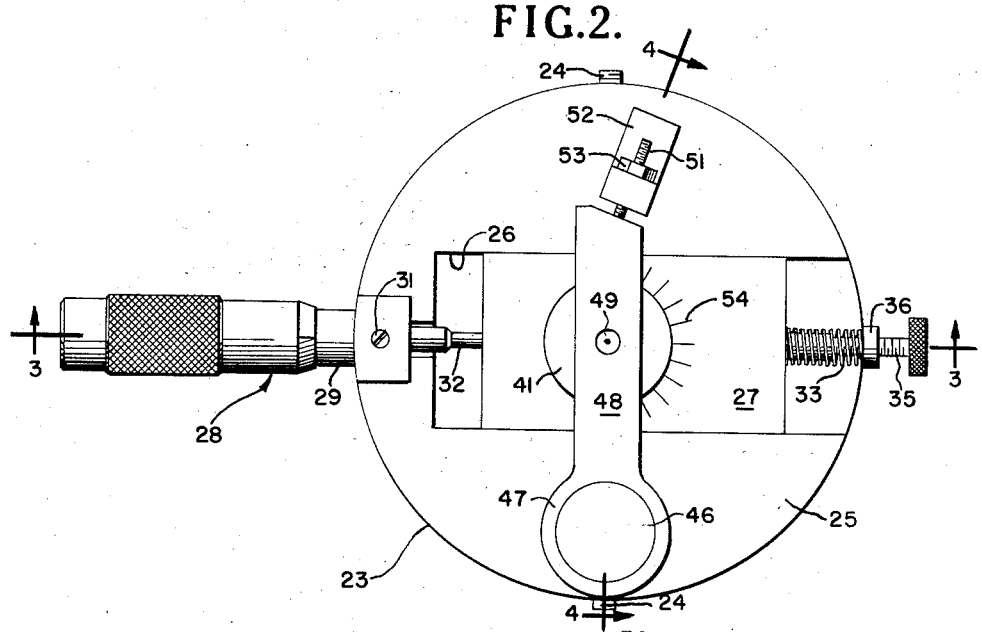
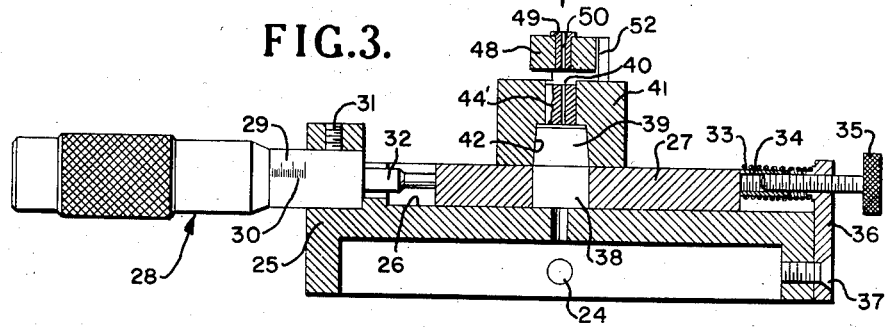
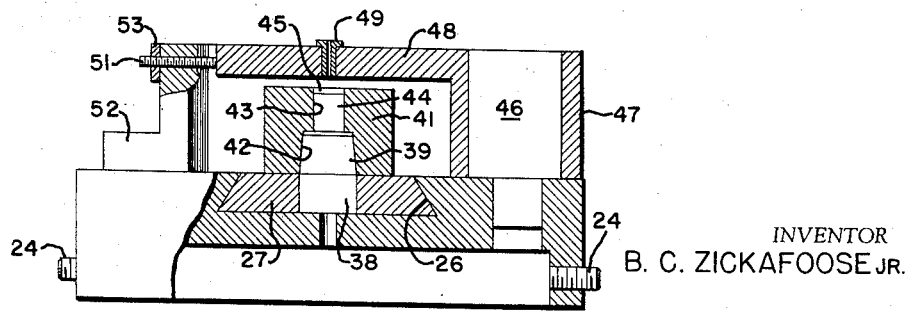
INVENTOR
B. C. ZICKAFOOSE JR.
BY
ATTORNEYS

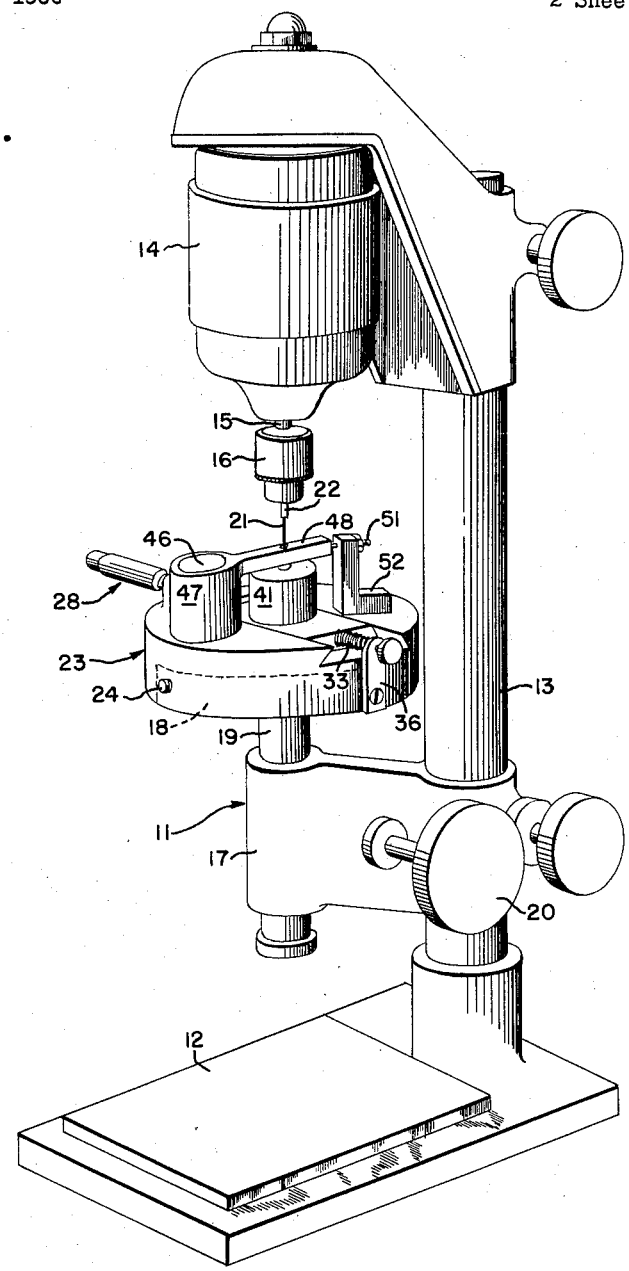

United States Patent Office 2,860,532
Patented Nov. 18, 1958

2,860,532

PRECISION DRILL AND ALIGNMENT FIXTURE

Basil C. Zickafoose, Jr., Takoma Park, Md.

Application June 29, 1956, Serial No. 595,026

4 Claims. (Cl. 77—62)

(Granted under Title 35, U. S. Code (1952), sec. 266)

The invention disclosed herein may be manufactured and used by or for the Government of the United States of America for governmental purposes without the payment of any royalties thereon or therefor.

The present invention relates to a high speed drill attachment, and more particularly to a precision drill and alignment fixture for drilling holes of microscopic size with great precision, as to size of hole, cleanliness and exact location, in a facile and rapid manner.

Heretofore, use was made of a threaded projection with a location shoulder and a corresponding steel cap, machined to very close tolerances, ±.0005 of an inch. This necessitated painstaking effort each time the spacing of the holes was changed, as a new cap had to be machined, holes located under a microscope and then drilled by hand, and checked to see if they were within tolerances. This method was extremely time consuming and resulted in excessive drill breakage and spoilage of machined caps.

Essentially, the present invention comprises a support plate adapted to be secured to the drill pad, the plate being machined with a dove-tail groove into which a mating piece or carriage is fitted for sliding movement or travel relative to the plate. A micrometer with the spindle thereof in engagement with the carriage provides for adjustable movement of the carriage which is spring biased to maintain a continuous pressure against the micrometer spindle. On the carriage there is located a projection which is adapted to be received in any one of a number of work support members which holds the component to be drilled, thereby providing for ready interchange of such members. To insure the accuracy of the drill, there is provided a movable arm supporting a guide sleeve which serves as a guide and bearing for the drill, the drill itself being inserted in a piece of rubber which acts as a flexible shaft coupling when inserted in the drill chuck; thereby insuring complete concentricity and accuracy of the finished hole.

It is therefore an object of the present invention to provide a new and improved fixture or attachment for a high speed drill press.

Another object is the provision of a novel drill press fixture which provides for the drilling of holes of small size that are spaced as desired.

A further object is the provision of a new precision drill and alignment fixture with micrometer adjustment means for precisely spacing and drilling holes of microscopic size.

Other objects and features of the invention will become apparent to those skilled in the art as the disclosure is made in the following detailed description of a preferred embodiment of the invention as illustrated in the accompanying sheets of drawings in which:

Fig. 1 is an elevational view, in perspective, of a drill press with the precision drill and alignment fixture of the present invention secured to the drill pad thereof;

Fig. 2 is a plan view of the fixture of this invention;

Fig. 3 is a sectional view along the lines 3—3 of Fig. 2 looking in the direction of the arrows and showing a member containing an element having an aligning opening therein; and Fig. 4 is an elevational view, partly in section, taken generally along the line 4—4 looking in the direction of the arrows but showing a member containing an element supporting a piece of work to be drilled.

Referring now to the drawings, wherein like reference characters designate like or corresponding parts throughout the several views, there is shown in Fig. 1 a conventional high speed drill press designated generally by numeral 11, having the usual base 12 from which upstands a cylindrical support 13 to the upper end of which an electric motor 14 is adjustably clamped. The motor has a shaft 15 to one end of which a conventional drill chuck 16 is secured, the drill chuck having jaws that are adjustable and adapted to receive and hold a drill. Also adjustably clamped to the support, is a drill pad support frame 17, the frame in turn adjustably supporting a drill pad 18 of the press, the drill pad being connected to an elongated member 19 which is mounted for sliding movement in said frame. Movement of the drill pad may be accomplished by means of a rack (not shown) on said elongated member and a pinion (not shown) meshing with the rack, the pinion being operatively connected to a hand wheel 20 for rotating the pinion and thereby moving the elongated member and drill pad attached thereto.

Ordinarily, a drill 21 is received in the drill chuck and held by the jaws thereof. In this case, however, the drill is inserted in an opening in one end of a rubber coupling element 22 and is frictionally held by the element, the other end of the element being grasped by the jaws of the drill chuck. Thus, the drill is flexibly coupled to the drill chuck, for reasons later made clear.

The precision drill and alignment fixture of the present invention, designated generally by the reference numeral 23, may be secured to the drill pad 18 of the press by any suitable means; for example, set screws 24. The fixture comprises a support plate 25 having a part adapted to be secured contiguous to the drill pad. The support plate has machined therein a dove-tail groove 26 in which a mating piece or carriage 27 is supported for sliding movement or travel.

Disposed at one end of the groove, and secured to the support plate, is a micrometer 28 having a head portion 29 provided with the usual indicia 30. The head portion is held stationary relative to the support plate by a set screw 31, or the like, the micrometer also having an adjustable spindle 32 normally contacting one end of the carriage. Reacting against the other end of the carriage is a spring 33 coiled about a sleeve 34 secured to the carriage and about a thumb screw 35 threaded in a bracket 36 which is secured to the support plate by a screw 37, or the like, the spring also reacting against the bracket to bias the carriage toward the micrometer spindle. Thumb screw 35 extends into sleeve 34 and serves as an adjustable stop means to limit movement of the carriage in one direction.

Projecting from the carriage 27 is an adapter element 38 having a tapering frusto-conical portion 39 which is adapted to be received in a work support member 41, the latter being provided with a tapering opening 42 into which the frusto-conical portion of the adapter element fits snugly. Member 41 is also provided with an opening 43 in which is received, with a snug fit, a cylindrical element 44 supporting a piece of work 45 to be drilled (Fig. 4) or an element 44' having an aligning opening 40 therein for a purpose later described. As will be understood, a plurality of members 41 may be provided, each containing a cylindrical element having an aligning opening therein or supporting a piece of work.

Also projecting from the support plate is a bearing post 46 about which is disposed a bearing sleeve 47 supporting a swingable arm 48, the latter being provided with an aperture in which a guide sleeve 49 having a guide opening 50 is received, the arm being swingable about the axis of the bearing post. The swing of the arm may be limited, as desired, by means of a threaded rod 51 threaded in an L-shaped bracket 52 secured to the support plate, the threaded rod having a lock nut 53 associated therewith to retain the rod in adjusted stop position.

Viewing Fig. 2, it will be noted that the axis of the bearing post is contained in a plane disposed at right angles to the center line and the line of travel of the mating piece or carriage. The distance between the axis of the bearing post and the axis of the guide sleeve is so chosen that when the axis of the guide sleeve is disposed in said plane, the axis of the guide sleeve is slightly beyond the line of travel of the carriage; whereby the swingable arm may be swung and adjusted so that the axis of the guide sleeve may be positioned in either of two positions on the center line and line of travel of the carriage.

In the use of the fixture to drill holes of microscopic size with precise spacing therebetween, a work support member is employed which contains a cylindrical element 44' having an aligning opening 40 therein, corresponding to the size of the guide opening 50 in the guide sleeve, which guide opening, in turn, is chosen according to the size of drill to be used. An aligning rod of proper size is passed through the guide opening in the guide sleeve, and the carriage and swingable arm are adjusted until the guide opening and the aligning opening in the cylindrical element are in alignment and the aligning rod has a lower portion thereof disposed in the aligning opening. The drill pad and chuck are now adjusted so that the drill chuck is aligned substantially with the aligning rod. The aligning rod is removed and a work support member supporting the piece of work to be drilled is substituted for the work support member containing the cylindrical element having the aligning opening.

The drill to be used is connected to the drill chuck by the rubber coupling element, the shank of the drill being inserted in an opening drilled in the element. The inner walls of the opening in the rubber coupling element frictionally engage and hold the end portion of the shank of the drill, the other end of the element being grasped and held between the jaws of the drill chuck; thereby providing a flexible shaft coupling between the drill chuck and the drill and compensating for any slight misalignment of the drill chuck and the drill guide opening. The parts are so adjusted and positioned that the guide sleeve will engage only the shank of the drill during the drilling operation; thereby avoiding contact between the guide sleeve and the bit portion of the drill and reducing wear.

The fixture is now ready for drilling a hole at the center of the piece of work. If it is desired to drill a hole at a precise distance from the center of the work, then the micrometer is adjusted to move the carriage, and the work carried thereby, the desired distance. Furthermore, the work support member and the carriage may be provided with suitable indicia 54; whereby drill openings may be angularly related to the center line of the carriage so as to obtain or achieve the desired relationships between the drill openings.

The flexible coupling between the drill chuck and the drill provides for a substantially uniform pressure on the drill allowing free cutting action of the drill through the work, and compensates for any eccentric motion occurring in the drill chuck or bearings of the drill press. Moreover, by observation of the amount of deformation of the flexible coupling, as the work is fed to the drill, the pressure of the drill on the work may be maintained substantially uniform; thereby dispensing with the need for means to counterbalance the drill pad and fixture and feeding the work by feel.

By employment of the fixture of this invention, drill breakage has been almost completely eliminated, due to the semi-fluid action of the rubber coupling providing at all times a substantially uniform pressure, and set-up time has been considerably reduced since the initial set-up is all that is necessary to locate the center of the work from which adjustments may be made to drill holes of very small dimensions in precisely spaced relation, the openings being cleanly drilled and of proper concentricity.

Various modifications are contemplated and may obviously be resorted to by those skilled in the art without departing from the spirit and scope of the invention, as only a preferred embodiment thereof has been disclosed.

What is claimed and desired to be secured by Letters Patent of the United States is:

1. In combination with a high speed precision drill press having a chuck and a movable pad, a drilling fixture for attachment to the pad comprising a base plate provided with a groove on the upper side thereof, a member fitted to said groove and movable therealong, adjustment means including a micrometer head and micrometer spindle, said micrometer head being secured to said plate with said spindle normally in contact with said member, spring means urging said member to maintain said contact with the spindle, means on said member for supporting a piece of work to be drilled, a swingable arm pivotally mounted on a post on said plate, said arm having a guide hole extending therethrough for receipt of a drill in alignment with the position of the desired hole in said piece of work and for support of the shank portion of the drill, an adjustable stop on said base plate adapted to engage said arm for positioning the guide hole in substantial alignment with the chuck of the drill press, and a flexible coupling interconnecting the drill and the chuck; whereby the drill drills into said piece of work and accuracy and concentricity of the finished hole is assured by accommodation of the flexible coupling to any slight misalignment of the chuck and drill.

2. The combination claimed in claim 1, in which the means for supporting the piece of work comprises a frusto-conical projection on the movable member, and a work piece support having a bore tapered to fit said frusto-conical projection for frictionally securing said support thereto.

3. A drilling fixture having provision for precisely spacing successively drilled holes of microscopic size, comprising a support plate having a dove-tail groove in the upper face portion thereof, a mating member supported for slidable movement in said dove-tail groove, micrometer means mounted on said plate and including a spindle adapted to move said member, means for spring biasing said member into contact with the micrometer spindle, a support element having an aligning opening therein, readily detachable means connecting said element to said member, movable means mounted on said plate for movement transversely of said element and having a guide hole therein adapted to receive a drill shank, adjustable stop means on said support plate for arresting movement of said movable means and for positioning said guide hole over said support element and in alignment with said aligning opening; whereby said support element may be replaced by a support element having a piece of work to be drilled and a drill operated through said hole is properly aligned and steadied for drilling said piece of work without engagement of the movable means by the bit portion of said drill, and whereby said piece of work may be accurately adjusted relative to the drill for locating successively drilled holes at precise distances.

4. A drilling fixture as defined in claim 3, further characterized in that the connecting means comprises a frusto-conical projection extending from the surface of the mating member, and said support elements each having a bore therein tapered to fit snugly said frusto-conical projection; whereby each said element is frictionally secured to said projection and is readily detachable therefrom for angular adjustment relative to the mating member.

References Cited in the file of this patent

UNITED STATES PATENTS

| 1,175,121 | Bugbee | Mar. 16, 1916 |
| 1,217,572 | Craley | Feb. 27, 1917 |
| 2,761,298 | Jarvis | Sept. 4, 1956 |
| 2,817,253 | Kulusic | Dec. 24, 1957 |

FOREIGN PATENTS

| 567,553 | Great Britain | Feb. 20, 1945 |